(12) United States Patent
Marquette

(10) Patent No.: US 9,457,747 B1
(45) Date of Patent: Oct. 4, 2016

(54) DETACHABLE PROTECTOR FOR STEEL BODIES

(71) Applicant: Russell C. Marquette, Hot Springs, AR (US)

(72) Inventor: Russell C. Marquette, Hot Springs, AR (US)

( * ) Notice: Subject to any disclaimer, the term of this patent is extended or adjusted under 35 U.S.C. 154(b) by 0 days.

(21) Appl. No.: 14/814,907

(22) Filed: Jul. 31, 2015

(51) Int. Cl.
*B60R 19/42* (2006.01)
*B60R 19/38* (2006.01)
*B60R 19/02* (2006.01)
*B60R 19/18* (2006.01)

(52) U.S. Cl.
CPC ............ *B60R 19/42* (2013.01); *B60R 19/023* (2013.01); *B60R 19/18* (2013.01); *B60R 19/38* (2013.01); *B60R 2019/1893* (2013.01)

(58) Field of Classification Search
CPC ....... B60R 13/04; B60R 19/42; B60R 19/38; B60R 19/023; B60R 2019/1893
USPC .................................. 293/126, 128; 280/770
See application file for complete search history.

(56) References Cited

U.S. PATENT DOCUMENTS

| | | | |
|---|---|---|---|
| 1,560,040 A | 11/1925 | Celt | |
| 2,935,855 A * | 5/1960 | Reid | E02B 3/26 114/219 |
| 3,147,176 A * | 9/1964 | Haslam | B60R 13/04 16/86 A |
| 3,243,223 A | 3/1966 | Hoshell | |
| 3,325,639 A | 6/1967 | King | |
| 3,473,836 A | 10/1969 | Halter | |
| 3,659,887 A * | 5/1972 | Marquette | B60R 13/04 293/120 |
| 4,294,478 A | 10/1981 | Marquette | |
| 4,461,503 A * | 7/1984 | Melby | B60R 13/04 293/118 |
| 4,498,697 A * | 2/1985 | McGlone | B60R 13/04 293/128 |
| 4,726,614 A * | 2/1988 | Myers | B60R 13/04 293/1 |
| 4,896,911 A * | 1/1990 | Duke | B60J 11/06 150/166 |
| 4,948,637 A * | 8/1990 | Kessler | B60R 13/04 293/128 |
| 5,112,092 A | 5/1992 | Pucci | |
| 5,879,037 A | 3/1999 | Batiste | |
| 5,902,003 A * | 5/1999 | Hindson | B60J 11/02 293/128 |

(Continued)

OTHER PUBLICATIONS

Door Defender; http://www.doordefender.com/; Aug. 2015.

(Continued)

*Primary Examiner* — Gregory Blankenship
(74) *Attorney, Agent, or Firm* — Head, Johnson & Kachigian, P.C.

(57) ABSTRACT

A protector for metal objects, the protector comprising an elongate body and an elongate insert, where the elongate body and the elongate insert are magnetic. The protector may be formed of a resilient material. The protector may be magnetically attached to a vehicle door or other metallic surface to protect the surface from impacts. The protector may have an adjustable length or a fixed length. The elongate insert may be wrapped in coil, which may be powered by a battery to increase the magnetic field of the protector. The battery may be rechargeable via a solar panel in the protector. The protector may be part of a system that includes a magnetic panel within the door of a vehicle for proper placement of the protector thereon.

29 Claims, 8 Drawing Sheets

(56) References Cited

U.S. PATENT DOCUMENTS

| | | | |
|---|---|---|---|
| 6,311,451 B1* | 11/2001 | Wise | B60J 11/06 |
| | | | 293/128 |
| 6,406,080 B1 | 6/2002 | Davis | |
| 6,527,319 B1* | 3/2003 | Martel | B60R 19/42 |
| | | | 293/128 |
| 6,736,435 B1* | 5/2004 | Ditthavong | B60R 19/42 |
| | | | 293/128 |
| 7,073,830 B1* | 7/2006 | Chen | B60J 11/06 |
| | | | 293/109 |
| 7,090,266 B1 | 8/2006 | Price | |
| 7,635,152 B1 | 12/2009 | Janus | |
| 8,162,383 B2* | 4/2012 | Curtis | B60R 13/043 |
| | | | 296/180.4 |
| 8,573,661 B1 | 11/2013 | Moreno | |
| 2002/0105197 A1* | 8/2002 | Unterwagner | B60R 13/04 |
| | | | 293/128 |
| 2006/0197348 A1* | 9/2006 | Hochrein | B60R 13/04 |
| | | | 293/128 |
| 2009/0140533 A1* | 6/2009 | Keough | B60R 19/42 |
| | | | 293/109 |
| 2012/0153646 A1* | 6/2012 | Curtis | B60R 13/043 |
| | | | 293/128 |
| 2015/0123412 A1* | 5/2015 | Kim | B60R 13/043 |
| | | | 293/128 |

OTHER PUBLICATIONS

Trim-Guard; http://trim-gard.com/; Aug. 2015.
Black Door Edge Guard; http://www.carid.com/ri/black-door-edge-guard-mpn-11-101-deg150b.html; Aug. 2015.
Ding Blocker by Knocker Blocker; http://www.bonanza.com/listings/Car-Door-Ding-Scratch-Preventer-by-KnockerBlocker/5416618; Aug. 2015.
Door Shox; http://www.doorshox.com/; Aug. 2015.
Park Smart Door Guard; http://www.autoanything.com/garage-accessories/park-smart-door-guard-customer-reviews.

* cited by examiner

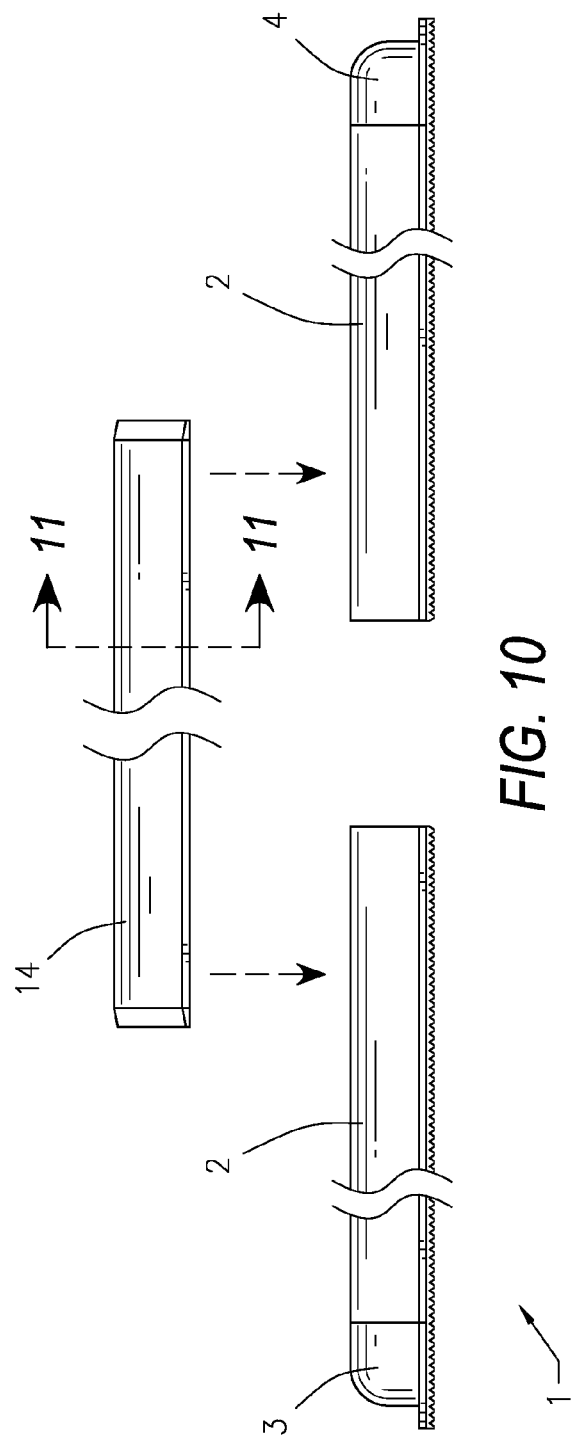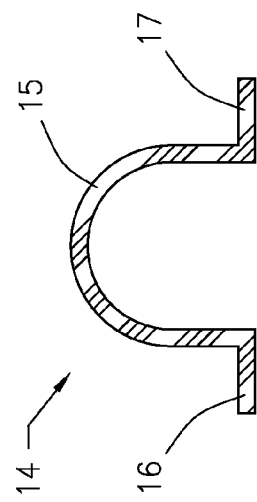

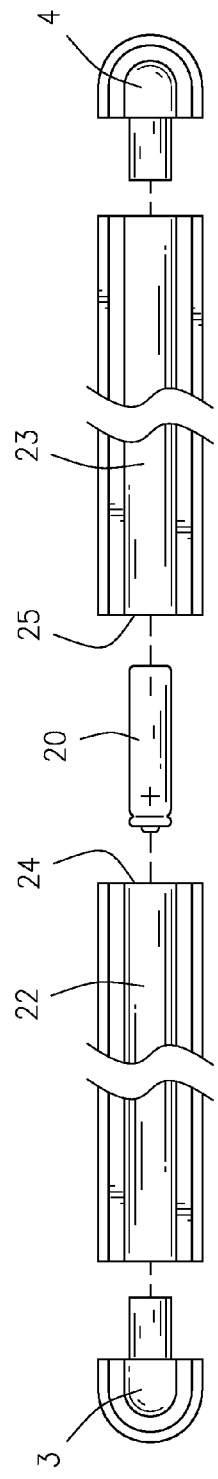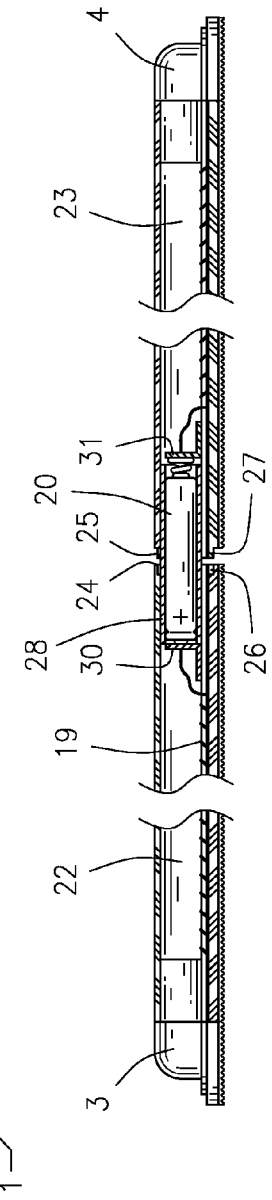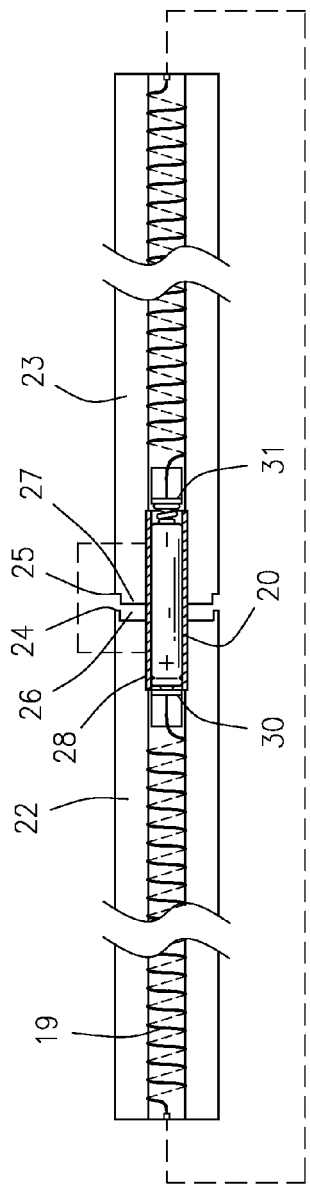

DETACHABLE PROTECTOR FOR STEEL BODIES

CROSS REFERENCE

Not Applicable.

BACKGROUND OF THE INVENTION

1. Field of the Invention

This invention relates generally to an improved detachable protector for steel bodies, and more particularly to a device for protecting the exterior finish of a vehicle from damage caused by neighboring vehicles in parking lots, garages, or the like.

2. Description of the Related Art

Due to the large and ever-growing number of motor vehicles, it has become a common parking lot practice to park vehicles as close as possible. Consequently, when a vehicle is being entered or exited, the door of one vehicle often comes in contact with the side of an adjacent vehicle. This door contact often results in a marring or chipping of the exterior finish of the vehicle hit, causing a diminution in the eye-pleasing appearance thereof and also a reduction in the resale value thereof. This chipping and marring of the exterior surface of the vehicle is aggravated by the fact that many vehicles are presently being manufactured without any protecting devices longitudinally attached along the exterior sides, such as strips of chrome.

U.S. Pat. No. 3,659,887, which was issued on May 2, 1972 to Russell C. Marquette, the inventor of the present invention, addressed this problem with a detachable side protector comprising a base having slidably received on the upper surface thereof and magnetically held thereto two extension strips projecting horizontally therefrom in opposite directions, where the protector is magnetically held on the exterior surface of a steel body to prevent damage thereto during the opening of doors on neighboring vehicles. In the commercial application of the protector described therein, it became apparent that the protector must adhere firmly to a car door or other object to be protected with tenacity so that it can be removed only with significant effort. This problem is addressed in U.S. Pat. No. 4,294,478, issued Oct. 13, 1981, also to Russell C. Marquette. This patent describes an improved detachable protector for steel objects such as automobile doors, appliance doors, file cabinets, or any object which is subject to being struck by anything which would dent or deface the object, the protector being an elongated body composed of magnetic plastic material which adheres by magnetic attraction to ferrous metal, the body being defined in cross-section by a flat part having an upper surface and a bottom surface, the bottom surface being adapted to adhere to the steel object to be protected and the cross-section being further defined by an arcuate portion which extends from the upper surface of the flat part, the width of the arcuate portion being less than the flat part to leave portion of the flat part extending along each side of the arcuate part, and a thin elongated flat metal member positioned within the arcuate part and in engagement with the upper surface of the flat part to enhance the magnetic action of the body and, in the preferred arrangement, having a layer of adhesive on the lower surface of the flat part to help prevent the device from slipping after it is magnetically attached to the body to be protected. Despite this improvement, increased magnetic forces are desirable to better hold the device in place. Both U.S. Pat. No. 3,659,887 and U.S. Pat. No. 4,294,478 are incorporated herein by reference.

Based on the foregoing, it is desirable to provide a protector that can be attached to the side of a vehicle during parking and removed therefrom when the car is being driven.

It is further desirable for such a protector not to mar the surface of the vehicle and to be magnetically held to the exterior thereof.

It is further desirable for such a protector to provide sufficient magnetic force to allow the user to leave the protector in place while the car is driven, if desired.

SUMMARY OF THE INVENTION

In general, in a first aspect, the invention relates to a detachable protector for metal objects, the protector comprising: an elongated body formed of magnetic material, the body in cross-section being defined by a thin flat part having an upper surface and a planar lower surface and an arcuate part extending from the flat part upper surface, the arcuate part having a width less than that of the flat part, such that the flat part has side portions along each side of the arcuate part and an intermediate portion, where the side portions are integral with the arcuate part; and an elongated magnetic insert of length substantially equal to that of the elongated body positioned within the arcuate part and in close engagement with the upper surface of the flat part, the magnetic insert having a width substantially equal to an internal width of the arcuate part at a point adjacent the upper surface of the intermediate portion of the flat part.

The intermediate portion of the flat part may be a separate element bonded to the arcuate part or may be integral with the side portions. The protector may further comprise a coil surrounding the magnetic insert. A power source, such as a battery or a solar panel, may be connected to the coil. The detachable protector may further comprise an adhesive layer on the lower surface of the flat part. The body may be comprised of a rubber ferrite composite.

In a second embodiment, an apparatus for protecting the exterior of a steel body comprises: a base strip of resilient material, said strip having an elongated arcuate-in-cross section portion bordered along each longitudinal edge thereof by integral flat horizontal flanges extending outwardly therefrom to form contact surfaces for attachment of the base strip to the exterior of a vehicle, the base strip being magnetized whereby when said flanges are placed in contact with the exterior of the body the base strip is magnetically held thereto and the arcuate portion projects outwardly from the exterior to receive and absorb any shock imparted thereto; a magnetic insert positioned within the arcuate portion; and an extension strip of resilient material, the extension strip being magnetized and having an elongated arcuate-in-cross-section portion mating the curvature of the base strip and bordered along the longitudinal edges thereof by integral flat horizontal flanges extending outwardly therefrom to form contact surfaces for attachment of the extension strips to the exterior of the body, the extension strip being magnetically saddled on the upper surface of the base strip and slidable relative thereto to vary the longitudinal length of the apparatus. The apparatus may further comprise a coil surrounding the magnetic insert and/or an adhesive layer on the lower surface of the base strip. The base strip may be comprised of a rubber ferrite composite. The apparatus may further comprise a second base strip, where the extension strip spans a gap between the base strip and a second extension strip.

In a third embodiment, a protector for metal objects comprises an elongate body with a cross section comprising an arcuate part; an elongate base, where the base is at least as wide as the elongate body and where the elongate body rests atop the elongate base; and an elongate insert, where the insert is narrower than an internal width of the arcuate part of the elongate body, such that the insert fits within the arcuate part of the elongate body. The elongate body, the elongate base, and the elongate insert may be magnetic and the elongate base may be formed of a resilient material. The cross section of the elongate body may further comprise two leg portions, where the two leg portions lie in a common plane with a space therebetween and where the arcuate part spans the space between the two leg portions. The elongate body and the elongate base may be formed of magnetic rubber material. The protector may further comprise a layer of cured silicone at least partially covering a bottom surface of the elongate base. The cured silicone may be grooved.

The protector may further comprise: a second elongate body with a cross section comprising an arcuate part, where the second elongate body is magnetic; a second elongate base, where the base is at least as wide as the second elongate body and where the second elongate body rests atop the second elongate base, where the second elongate base is magnetic and formed of a resilient material; a second elongate insert, where the insert is narrower than an internal width of the arcuate part of the second elongate body, such that the insert fits within the arcuate part of the second elongate body, and where the second elongate insert is magnetic; and an extension strip spanning a gap between the first elongate body and the second elongate body, where the extension strip is an elongate strip with a cross section comprising an arcuate part with an interior diameter greater than an exterior diameter of the arcuate part of the elongate body and the arcuate part of the second arcuate body, such that the extension strip at least partially fits atop the elongate body and the second elongate body.

The elongate insert may be metal and wrapped in coil. The protector may further comprise a battery powering the coil such that the coil increases the elongate insert's magnetic force. The protector may further comprise: a second elongate body with a cross section comprising an arcuate part, where the second elongate body is magnetic; a second elongate base, where the base is at least as wide as the second elongate body and where the second elongate body rests atop the second elongate base, where the second elongate base is magnetic and formed of a resilient material; and a second elongate insert, where the insert is narrower than an internal width of the arcuate part of the second elongate body, such that the insert fits within the arcuate part of the second elongate body, and where the second elongate insert is magnetic and wrapped in coil, where the battery fits partially within one end of the elongate body and partially within one end of the second elongate body to connect the elongate body to the second elongate body and to complete a circuit comprising the battery, the coil wrapped around the elongate insert, the coil wrapped around the second elongate insert, the elongate insert, and the second elongate insert. The protector may further comprise a housing around the battery. The battery may be rechargeable, and the protector may further comprise a solar panel assembly connected to and capable of recharging the battery.

In a fourth embodiment, a system of protecting a vehicle may comprise a magnetic protector and a magnetic member installed within a door of the vehicle, where the protector is magnetically attracted to the magnetic member. The magnetic protector may comprise: an elongate body with a cross section comprising an arcuate part; an elongate base, where the base is at least as wide as the elongate body and where the elongate body rests atop the elongate base; and an elongate insert, where the insert is narrower than an internal width of the arcuate part of the elongate body, such that the insert fits within the arcuate part of the elongate body, where the elongate body, the elongate base, and the elongate insert are magnetic and the elongate base is formed of a resilient material. The system may further comprise a plurality of magnetic protectors and a plurality of magnetic members. The magnetic members may be welded to the interior of the door or may be attached to the interior of the door via adhesive.

BRIEF DESCRIPTION OF THE DRAWINGS

FIG. 10 is an exploded view of the extendable version of the protector;

FIG. 11 is a cross section of the extension strip;

FIG. 15 is an exploded view of the battery powered version of the protector;

FIG. 16 is a cut away view of the battery powered version of the protector;

FIG. 17 is a cross section view of the battery powered version of the protector;

Figure 1:
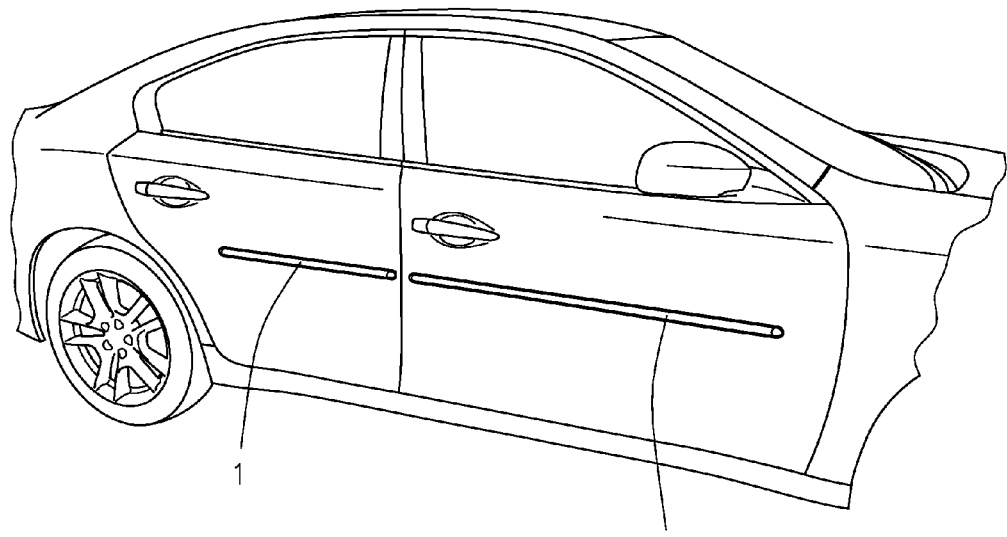
FIG. 1 is a perspective view of the protector in place on a vehicle.
Figure 2:
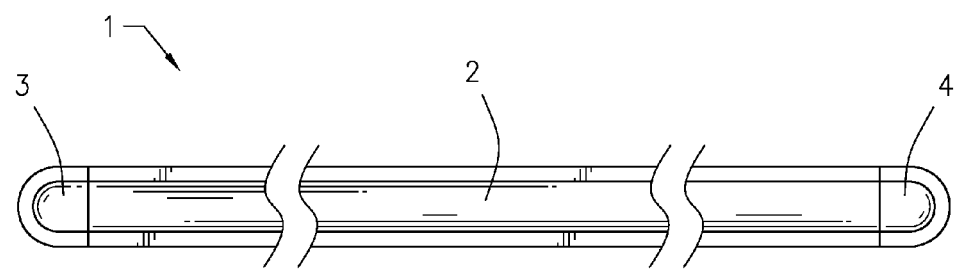
FIG. 2 is a top view of the protector.
Figure 3:
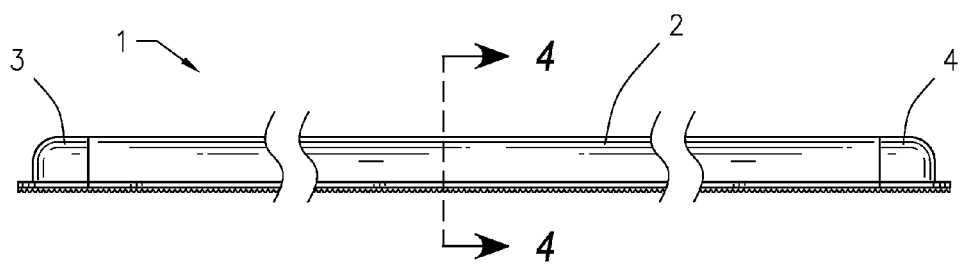
FIG. 3 is a side view of the protector.
Figure 4:
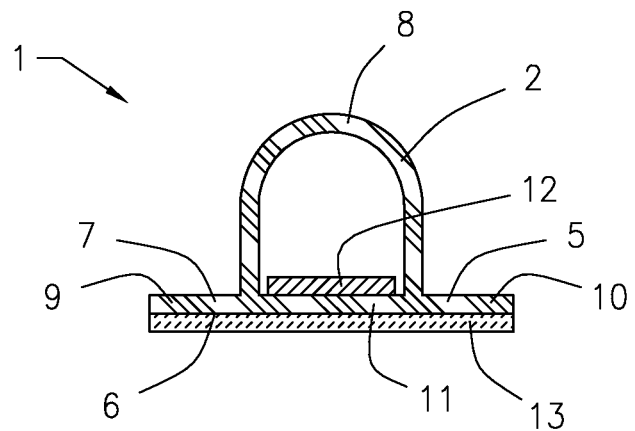
FIG. 4 is a cross section of the extruded version of the protector.
Figure 5:
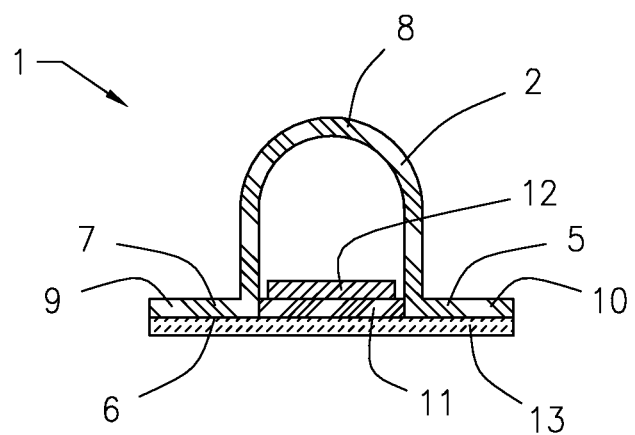
FIG. 5 is a cross section of the version of the protector with a separate intermediate piece.
Figure 6:
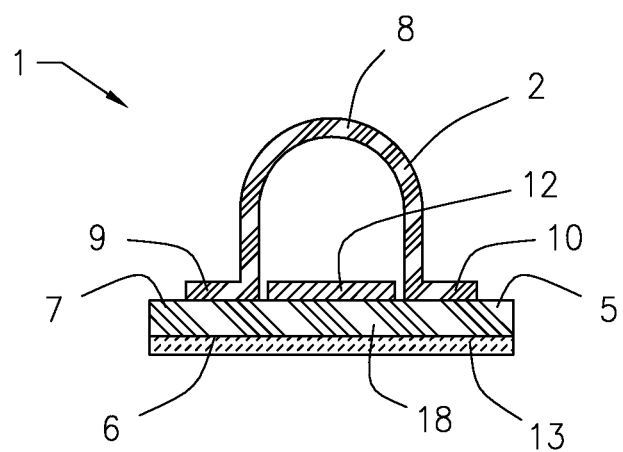
FIG. 6 is a cross section of the version of the protector with a separate full-width base piece.
Figure 7:
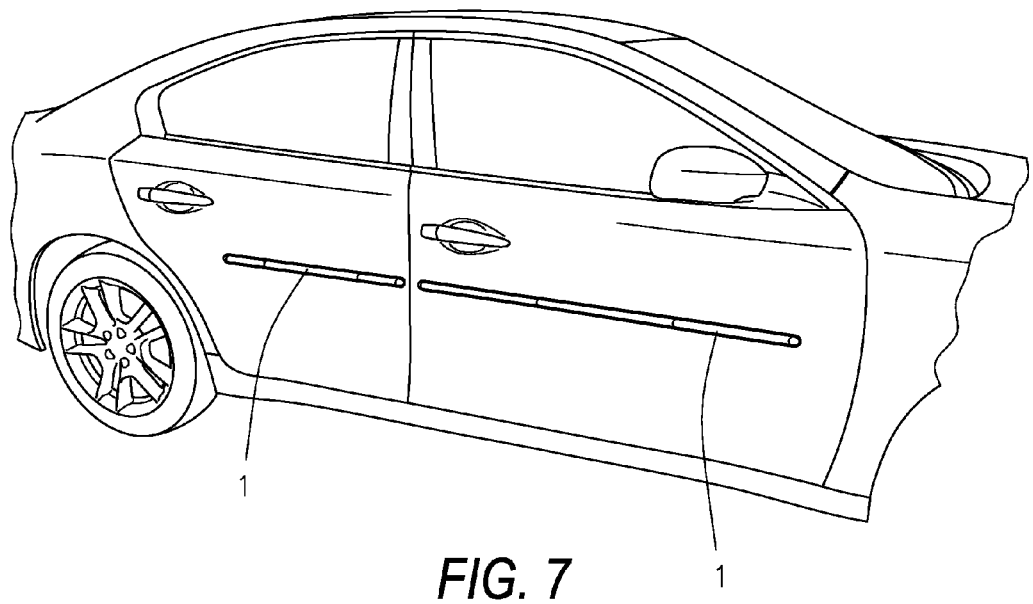
FIG. 7 is a perspective view of the extendable version of the protector in place on a vehicle.
Figure 8:
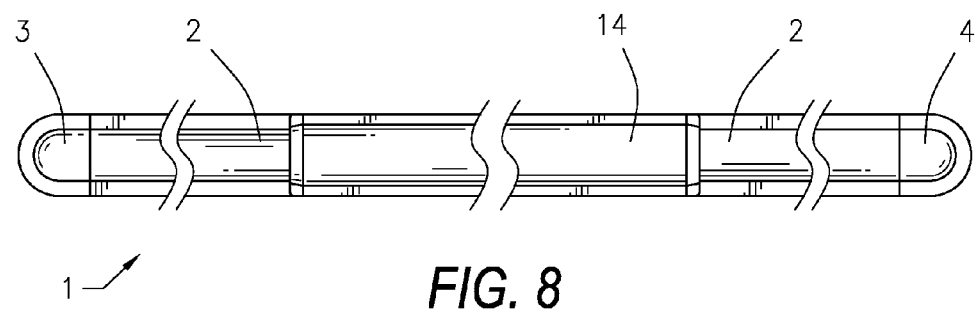
FIG. 8 is a top view of the extendable version of the protector.
Figure 9:
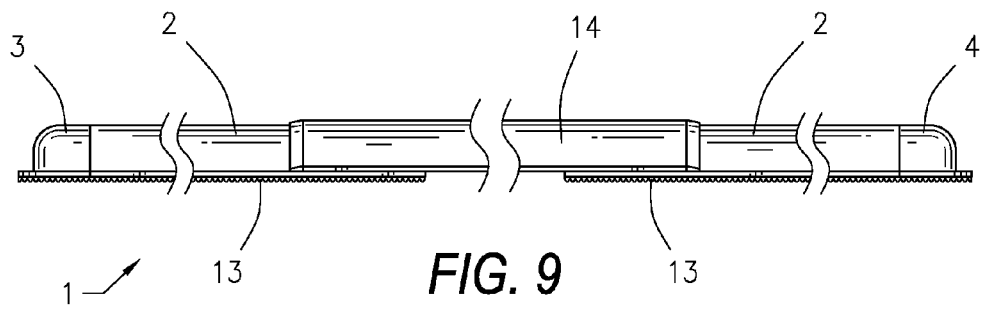
FIG. 9 is a side view of the extendable version of the protector.
Figure 12:
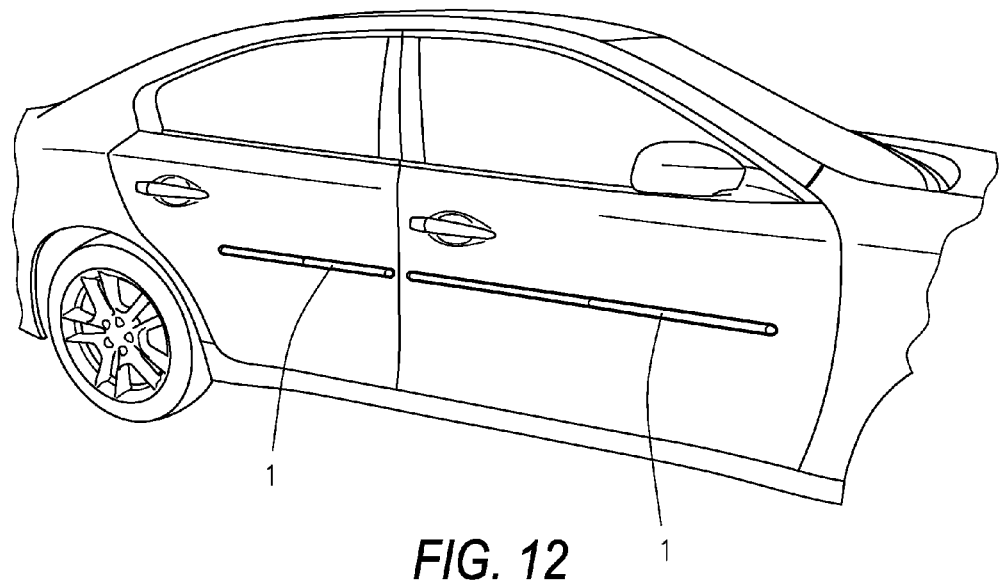
FIG. 12 is a perspective view of the battery powered version of the protector in place on a vehicle.
Figure 13:
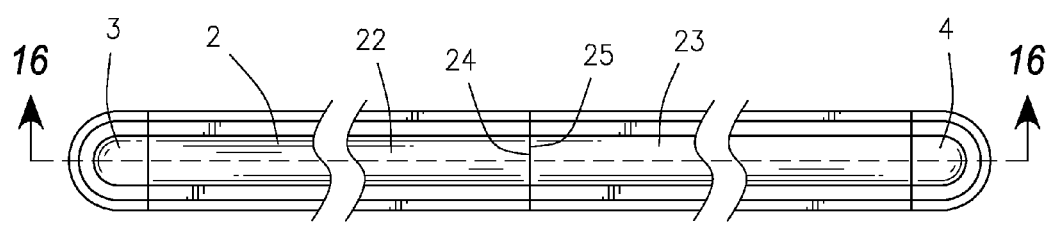
FIG. 13 is a top view of the battery powered version of the protector.
Figure 14:
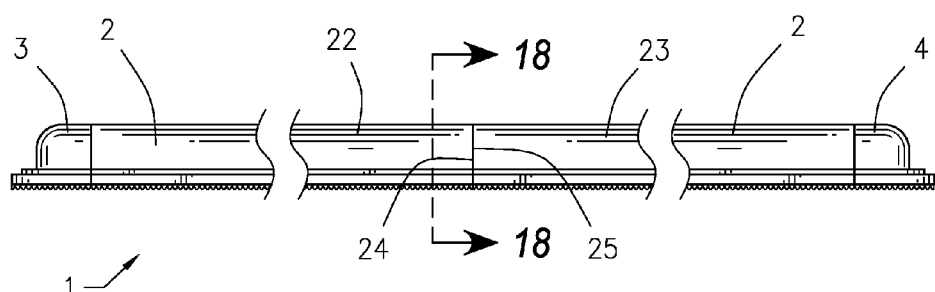
FIG. 14 is a side view of the battery powered version of the protector.
Figure 18:
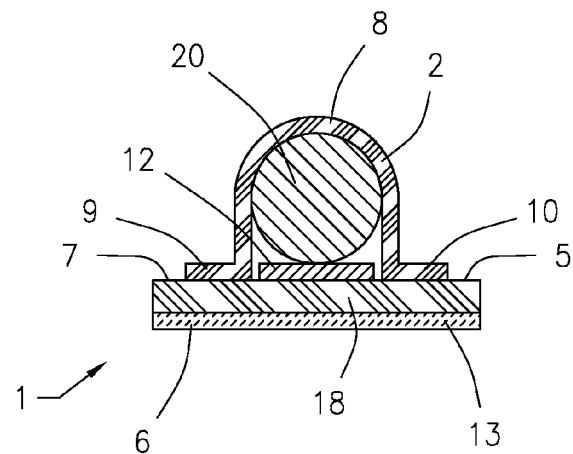
FIG. 18 is a cross section view of the battery powered version of the protector.
Figure 19:
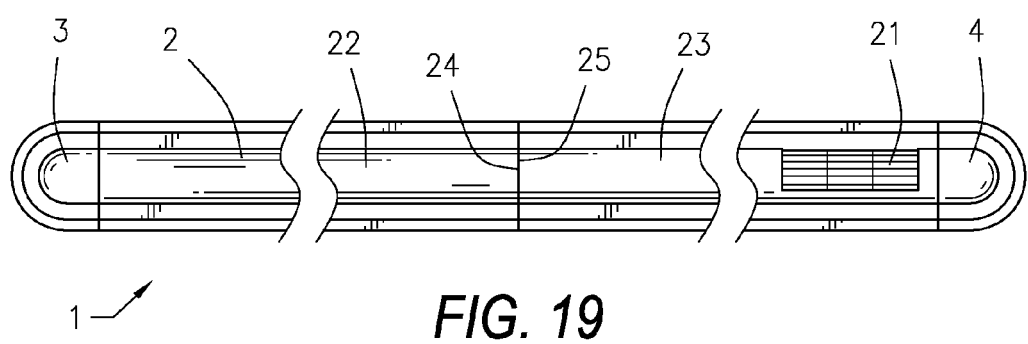
FIG. 19 is a top view of the battery powered version of the protector with optional solar panel.
Figure 20:
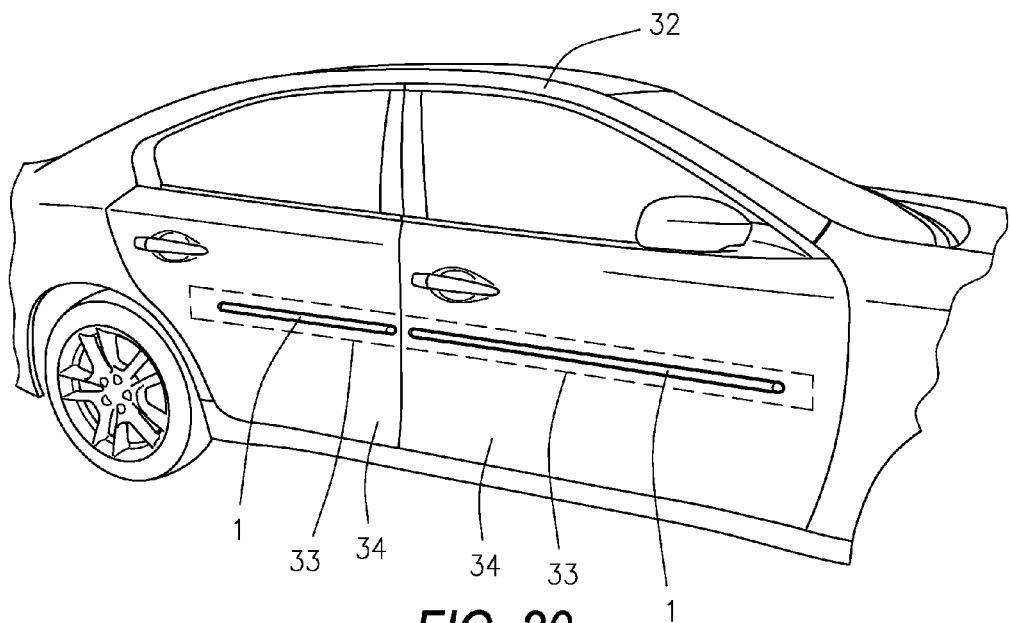
FIG. 20 is a perspective view of the protector in place on a vehicle with optional magnetic members within its doors.
Figure 21:
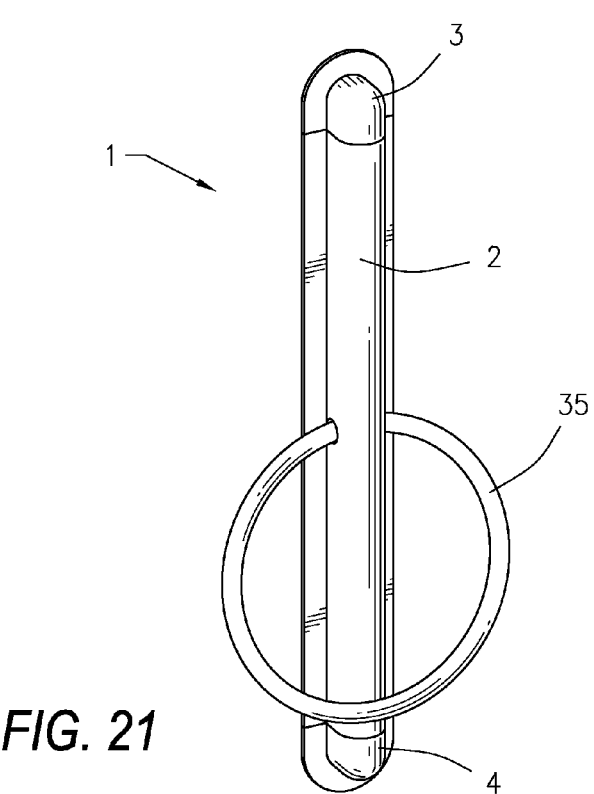
FIG. 21 is a perspective view of the protector with optional towel ring.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a protector 1, which may include a body portion 2 and decorative end caps 3 and 4. The body 2 may include a thin flat part 5 having a bottom surface 6 and a top surface 7. An arcuate part 8 may extend from the top surface. The width of the arcuate part 8 may be less than that of the flat part 5 so that, in effect, the flat part 5 comprises three portions: two leg portions 9 and 10 and an intermediate portion 11.

The body 2, including the thin flat part 5 and the arcuate part 8, may be formed of magnetic plastic or magnetic rubber material, such as a rubber ferrite composite. For example, the body 2 may be fabricated from a blend of ferrite powder and polyethylene plastic extrusion molded into the desired shapes. The body 2 may then be passed through a magnetizer wherein the ferrite powder is magnetized to transform the body 2 into a permanent magnet, with the north pole on the upper surface 7 and the south pole on the bottom surface 6. The entire body 2 may be integrally formed, with the arcuate part 8, legs 9 and 10 of the flat part 5, and intermediate portion 11 of the flat part 5 all forming one piece. For example, the entire body 2 may be formed through extrusion. Alternately, the intermediate portion 11 may be a separate piece, which may be held to the rest of the body 2 by friction fit, magnetic attraction, adhesive, or a combination thereof. If adhesive is used, the adhesive may be silicone rubber, double-backed adhesive tape, or any other desired adhesive.

An insert 12 may be positioned between the intermediate portion 11 and the arcuate part 8. The insert 12 may be thin, elongated, flat, and made of paramagnetic material. Alternately, the insert 12 may be made of magnetic material. If the insert 12 is magnetic, it may have lines of force matching those of the body 2, thus enhancing the magnetic attachment of the protector 1. The insert 12 may provide additional stability to the protector 1, as well as increase the magnetic attraction of the body 2 to a structure to which the protector 1 is mounted, such as by offering a high permeability magnetic flux flow path. Insert 12 may have a width equal to or slightly less than the internal width of the arcuate part 8. The insert 12 may be positioned within the arcuate part 8 and in engagement with the top surface 7 of the flat part 5, specifically the intermediate portion 11 of the flat part 5. The arcuate part 8 may mechanically confine the insert 12, while the magnetic attraction of the intermediate portion 11 may keep the insert 12 in engagement therewith.

The protector 1 may further comprise a layer of adhesive 13 on the bottom surface 6 of the flat part 5. The adhesive 13 may be in the form of silicone rubber to provide a non-slip surface to help insure that the protector 1 securely adheres to the structure to which the protector 1 is mounted and to protect the surface of the structure to which the protector 1 is mounted. Alternately, the layer of adhesive 13 may take the form of a double-backed adhesive tape or any other desired adhesive. In this way, the protector 1 may be secured to the structure to which the protector 1 is mounted both by the magnetic properties of the protector 1 plus the adhesive properties of the adhesive layer 13. The adhesive layer 13 may have grooves or other texture to improve its grip on the surface of the structure to which the protector 1 is mounted. Alternately, the adhesive layer 13 may be silicone that is horizontally grooved then cured so that it is no longer sticky. This layer 13 may help prevent dust from getting under the protector 1 and marring the surface upon which the protector 1 is placed. The adhesive layer 13 may likewise be applied to the end caps 3 and 4. Alternately, the adhesive layer 13 may not be adhesive but may be a material for protecting the surface of the structure to which the protector is mounted 1, such as felt.

The protector 1 may further comprise an extension strip 14 that may be slidably received on the body 2. The extension strip 14 may have an arcuate portion 15 bordered along each longitudinal edge thereof by a horizontal flange 16 and 17, where the extension strip 14 is sized such that the arcuate portion 15 may fit over the arcuate part 8 of the body 2 and the flanges 16 and 17 may fit on the top surface 7 of the leg portions 9 and 10 of the flat part 5 of the body 2. The extension strip 14 may slide along the top of the body 2 to extend the length of the protector 1. The protector 1 may comprise two bodies 2 with an extension strip spanning a gap between the two bodies 2, further extending the length of the protector 1.

Decorative end caps 3 and 4 may be attached to either end of the body 2 and/or to the extension strip 14, if present. The end caps 3 and 4 may be downwardly rounded to increase the aesthetic appearance of the protector 1, while the ends of the body 2 may be perpendicular to the length thereof. If the end caps 3 and 4 are omitted, the ends of the body 2 may be downwardly rounded. If one or more extension strips 14 are included in the protector, any outer ends may be downwardly rounded while any inner ends may be perpendicular to the length thereof in order to permit slidable saddling thereof on the upper surface of the body 2.

In one alternate embodiment, rather than having an intermediate portion 11 between the two legs 9 and 10, the body 2 may rest on a base 18 that has a width substantially equal to that of the body 2. The base 18 may be formed of magnetic plastic or magnetic rubber material, such as a rubber ferrite composite. The base 18 may be designed to receive the legs 9 and 10 for a better attachment. The base 18 may attach to the body 2 through friction fit, magnetic force, adhesive, or a combination thereof. The adhesive may be silicone adhesive, adhesive tape, or any other desired adhesive. The base 18 may be designed to accept the insert 12, which may be narrower that the base 18. Indeed, the insert 12 may be slightly narrower than the space between the two legs 9 and 10 such that it may fit atop the base 18 between the legs 9 and 10. The base 18, body 2, and insert 12 may all be magnetized with matching magnetic lines to enhance the flux field of the protector 1 for greater attachment. The bottom of the base 18 may be coated in adhesive layer 13, as described above.

Additionally or alternatively, the insert 12 may be wrapped or encircled by a coil 19, such as a steel or copper wire wrapped around the insert 12 to create a higher magnetic flux field. Optionally, the coil 19 may be powered by a power source, such as one or more battery 20, one or more solar panel 21, other power source, or a combination thereof, to further increase the flux field. If the coil 19 is powered by a battery 20, the battery 20 may be housed within the arcuate part 8. The battery 20 may be a AAA battery or any other suitable battery.

The body 2 may comprise two sides 22 and 23, where one end 24 of side 22 abuts one end 25 of side 23 such that sides 22 and 23 lie in the same plane and form a single elongate body 2. End 24 of side 22 may have a recess 26 and end 25 of side 23 may have a projection 27 that is receivable in the recess 26 to join the two sides 22 and 23 together. If a battery 20 is housed within the arcuate part 8, it may span the ends 24 and 25 to join sides 22 and 23 together. The battery 20 may complete a circuit, powering the coil 19 when the two sides 22 and 23 are joined. The battery 20 may be housed within a housing 28, with a spring and positive contact 30 and a negative contact 31 on opposing ends. The housing 28 may be a thin metal sleeve encasing the battery 20 and completing the circuit. The sleeve may be permanently attached to the negative contact 31 and coil 19 and may be inserted into the positive side of the battery contact portion 30 of the coil 19. The housing 28 may be magnetized to hold the battery in place. Alternately, if no battery 20 is present, a connector may span the ends 24 and 25 to join sides 22 and 23 together. For example, the connector may be a short length of nylon rod.

If the coil 19 is at least partially powered by solar energy, a solar panel 21 may be located in one or both of the end caps 3 and 4, in the arcuate part 8, in one or both of the legs 9 and 10, in an additional structure appended to the body 2, or any combination thereof. The solar panel 21 may be connected to a rechargeable battery, which may or may not be battery 20, or other device for storing such energy.

The insert 12 may be insulated from the body 2 to prevent the loss of energy from the coil 19.

In another alternative embodiment, a vehicle 32 may be manufactured with magnetic member 33 placed on the interior surface of the door 34 of the vehicle 32 to attract and hold the protector 1 in place. The magnetic member 33 may be permanently attached, such as through welding, or semi-permanently or temporarily, such as via adhesive. This magnetic member 33 may also repel an adjacent vehicle door with its own magnetic member 33. Alternately, an area of the outer surface of the door 34 may be magnetized to increase the magnetic attraction between the protector 1 and the door 34. Likewise, an area of the outer surface of the door 34 may be magnetized and a second area, such as the edge of the door, may be magnetized in such a way that, when two magnetized vehicles are parked adjacent to each other, the magnetized area repels the second magnetized area of an adjacent vehicle. This would be particularly valuable to protect small cars that would otherwise be hit by opening adjacent car doors in areas in which mounting a protector 1 would be impractical or aesthetically undesirable.

One or more of the protectors 1 may be affixed in horizontal alignment along the exterior side of a vehicle at the outermost portion thereof so as to receive any shock imparted thereto, such as by a door from an adjacent vehicle being banged thereagainst during the opening thereof. In operation, when an automobile is parked such as in a parking lot, a user may adjust the length of the protector 1, if one or more extension strips 14 are present, by slidably traveling the extension strips 14 relative to the body or bodies 2 to attain the optimum protection for the vehicle. The user may then merely attach one or more of the protectors 1 along the exterior side of the vehicle at points susceptible to being hit by the edge of a door of a neighboring vehicle being opened. When the door of a neighboring vehicle is opened, the protectors 1 may receive and, due to the plasticity thereof, absorb the shock and consequently prevent any marring of the vehicle's exterior finish. When there is no need for the protective device such as when the car is being driven, the protector 1 can be removed and collapsed by stacking the extension strip 14 onto the upper surface 6 of the body 2 to facilitate storage thereof such as in the glove compartment or trunk of the vehicle. Alternately, the protector 1 may be left in place, as the increased magnetic field of the protector 1 may be strong enough to hold the protector 1 in place even when the vehicle is in motion.

The protector 1 may additionally be used on surfaces other than those of automobiles, such as appliance doors, file cabinets, or any object which is subject to being struck by anything which would dent or deface the object. One or more accessories, such as a towel ring 35 a shown, may be included to offer additional utility. Most restaurants have soiled cleaning towels lying around the kitchen area. The protector 1 with towel ring 35 would be very useful and could be conveniently placed on a stainless steel wall, stove, oven, etc., or wherever needed.

Whereas, the devices and methods have been described in relation to the drawings and claims, it should be understood that other and further modifications, apart from those shown or suggested herein, may be made within the spirit and scope of this invention.

What is claimed is:

1. A detachable protector for metal objects, the protector comprising:
    an elongated body formed of magnetic material, the body in cross-section being defined by a thin flat part having an upper surface and a planar lower surface and an arcuate part extending from the flat part upper surface, the arcuate part having a width less than that of the flat part, such that the flat part has side portions along each side of the arcuate part and an intermediate portion, where the side portions are integral with the arcuate part;
    an elongated magnetic insert of length substantially equal to that of the elongated body positioned within the arcuate part and in close engagement with the upper surface of the flat part, the magnetic insert having a width substantially equal to an internal width of the arcuate part at a point adjacent the upper surface of the intermediate portion of the flat part; and
    a coil surrounding the magnetic insert.

2. The detachable protector for metal objects of claim 1 were the intermediate portion of the flat part is a separate element bonded to the arcuate part.

3. The detachable protector for metal objects of claim 1 where the intermediate portion of the flat part is integral with the side portions.

4. The detachable protector for metal objects of claim 1 further comprising a power source connected to the coil.

5. The detachable protector for metal objects of claim 4 where the power source comprises a battery.

6. The detachable protector for metal objects of claim 5 further comprising a thin metal sleeve encasing the battery.

7. The detachable protector for metal objects of claim 4 where the power source comprises a solar panel.

8. The detachable protector for metal objects of claim 1 further comprising an adhesive layer on the lower surface of the flat part.

9. The detachable protector for metal objects of claim 1 where the body is comprised of a rubber ferrite composite.

10. An apparatus for protecting the exterior of a steel body comprising:
    a base strip of resilient material, said strip having an elongated arcuate-in-cross section portion bordered along each longitudinal edge thereof by integral flat horizontal flanges extending outwardly therefrom to form contact surfaces for attachment of the base strip to the exterior of a vehicle, the base strip being magnetized whereby when said flanges are placed in contact with the exterior of the body the base strip is magnetically held thereto and the arcuate portion projects outwardly from the exterior to receive and absorb any shock imparted thereto;

a magnetic insert positioned within the arcuate portion;
a coil surrounding the magnetic insert; and
an extension strip of resilient material, the extension strip being magnetized and having an elongated arcuate-in-cross-section portion mating the curvature of the base strip and bordered along the longitudinal edges thereof by integral flat horizontal flanges extending outwardly therefrom to form contact surfaces for attachment of the extension strip to the exterior of the body, the extension strip being magnetically saddled on the upper surface of the base strip and slidable relative thereto to vary the longitudinal length of the apparatus.

11. The apparatus for protecting the exterior of a steel body of claim 10 further comprising an adhesive layer on the lower surface of the base strip.

12. The apparatus for protecting the exterior of a steel body of claim 10 where the base strip is comprised of a rubber ferrite composite.

13. The apparatus for protecting the exterior of a steel body of claim 10 further comprising a second base strip, where the extension strip spans a gap between the base strip and the second base strip.

14. A protector for Metal objects, the protector comprising:
an elongate body with a cross section comprising an arcuate part;
an elongate base, where the base is at least as wide as the elongate body and where the elongate body rests atop the elongate base; and
an elongate insert, where the insert is narrower than an internal width of the arcuate part of the elongate body, such that the insert fits within the arcuate part of the elongate body, and where the elongate insert is metal and wrapped in coil,
where the elongate body, the elongate base, and the elongate insert are magnetic and the elongate base is formed of a resilient material.

15. The protector of claim 14 where the cross section of the elongate body further comprises two leg portions, where the two leg portions lie in a common plane with a space therebetween and where the arcuate part spans the space between the two leg portions.

16. The protector of claim 14 where the elongate body and the elongate base are formed of magnetic rubber material.

17. The protector of claim 14 further comprising a layer of cured silicone at least partially covering a bottom surface of the elongate base.

18. The protector of claim 17 where the cured silicone is grooved.

19. The protector of claim 14 further comprising:
a second elongate body with a cross section comprising an arcuate part, where the second elongate body is magnetic;
a second elongate base, where the base is at least as wide as the second elongate body and where the second elongate body rests atop the second elongate base, where the second elongate base is magnetic and formed of a resilient material;
a second elongate insert, where the insert is narrower than an internal width of the arcuate part of the second elongate body, such that the insert fits within the arcuate part of the second elongate body, and where the second elongate insert is magnetic; and
an extension strip spanning a gap between the first elongate body and the second elongate body, where the extension strip is an elongate strip with a cross section comprising an arcuate part with an interior diameter greater than an exterior diameter of the arcuate part of the elongate body and the arcuate part of the second arcuate body, such that the extension strip at least partially fits atop the elongate body and the second elongate body.

20. The protector of claim 14 further comprising a battery powering the coil such that the coil increases the elongate insert's magnetic force.

21. The protector of claim 20 further comprising:
a second elongate body with a cross section comprising an arcuate part, where the second elongate body is magnetic;
a second elongate base, where the base is at least as wide as the second elongate body and where the second elongate body rests atop the second elongate base, where the second elongate base is magnetic and formed of a resilient material; and
a second elongate insert, where the insert is narrower than an internal width of the arcuate part of the second elongate body, such that the insert fits within the arcuate part of the second elongate body, and where the second elongate insert is magnetic and wrapped in coil;
where the battery fits partially within one end of the elongate body and partially within one end of the second elongate body to connect the elongate body to the second elongate body and to complete a circuit comprising the battery, the coil wrapped around the elongate insert, the coil wrapped around the second elongate insert, the elongate insert, and the second elongate insert.

22. The protector or claim 21 further comprising a housing around the battery.

23. The protector of claim 22 where the battery is rechargeable, the protector further comprising a solar panel assembly connected to and capable of recharging the battery.

24. A protector for metal objects, the protector comprising:
an elongate body with a cross section comprising an arcuate part;
a towel ring attached to the elongate body;
an elongate base, where the base is at least as wide as the elongate body and where the elongate body rests atop the elongate base; and
an elongate insert, where the insert is narrower than an internal width of the arcuate part of the elongate body, such that the insert fits within the arcuate part of the elongate body,
where the elongate body, the elongate base, and the elongate insert are magnetic and the elongate base is formed of a resilient material.

25. A system of protecting a vehicle, the system comprising:
a magnetic protector comprising:
an elongate body with a cross section comprising an arcuate part;
an elongate base, where the base is at least as wide as the elongate body and where the elongate body rests atop the elongate base; and
an elongate insert, where the insert is narrower than an internal width of the arcuate part of the elongate body, such that the insert fits within the arcuate part of the elongate body,
where the elongate body, the elongate base, and the elongate insert are magnetic and the elongate base is formed of a resilient material; and
a magnetic member installed within a door of the vehicle, where the protector is magnetically attracted to the magnetic member.

26. The system of claim 25 further comprising a plurality of magnetic protectors and a plurality of magnetic members.

27. The system of claim 25 where the magnetic member is welded to the interior of the door.

28. The system of claim 25 where the magnetic member is attached to the interior of the door via adhesive.

29. A system of protecting a vehicle, the system comprising:
- a magnetic protector comprising:
  - an elongate body with it cross section comprising an arcuate part;
  - an elongate base, where the base is at least as wide as the elongate body and where the elongate body rests atop the elongate base; and
  - an elongate insert, where the insert is narrower than an internal width of the arcuate part of the elongate body, such that the insert its within the arcuate part of the elongate body,
  - where the elongate body, the elongate base, and the elongate insert are to magnetic and the elongate base is formed of a resilient material; and
- a portion of a door of the vehicle, where the protector is magnetically attracted to the portion of the door and where the portion of the door is magnetized to increase the magnetic attraction between the protector and the portion of the door.

* * * * *